Figure 1:
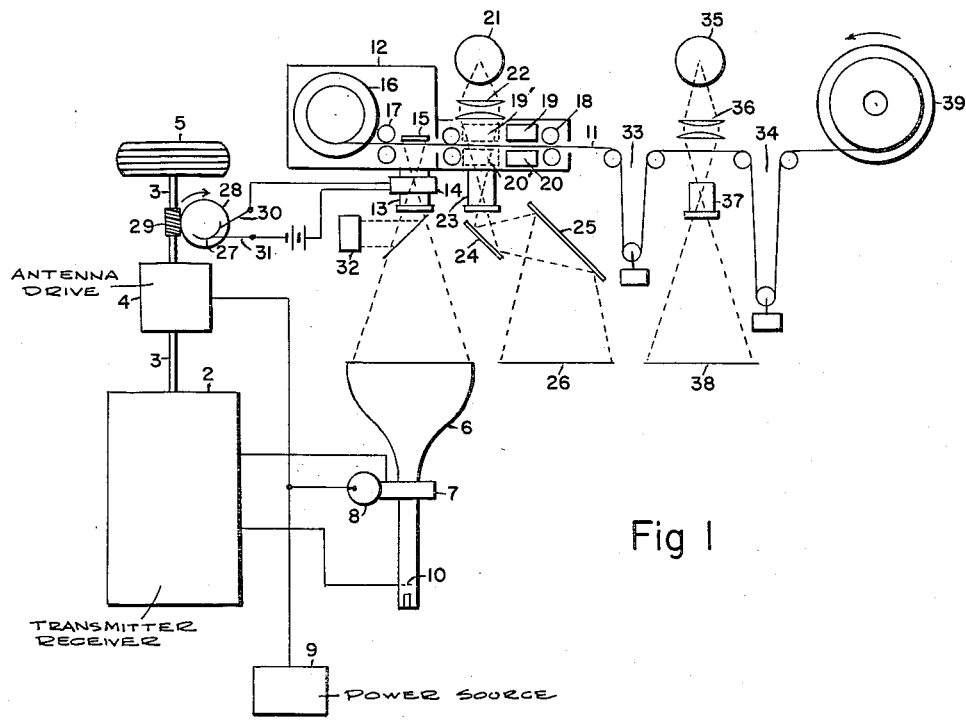

Feb. 21, 1961  J. H. HAMMOND, JR  2,972,741
SHIP'S COURSE RECORDER
Filed April 17, 1957

INVENTOR.
JOHN HAYS HAMMOND JR.
BY
ATTORNEY

United States Patent Office 2,972,741
Patented Feb. 21, 1961

2,972,741

SHIP'S COURSE RECORDER

John Hays Hammond, Jr., Hammond Research Corp., Gloucester, Mass.

Filed Apr. 17, 1957, Ser. No. 653,360

2 Claims. (Cl. 343—5)

This invention relates to radar systems for indicating the range and bearing of near objects. More particularly the invention provides means to supplement a radar system installed on a moving vehicle whereby a permanent record of the courses of near ships and other objects relative to the radar ship are permanently recorded.

A radar system installed on a moving vehicle, such as a ship, indicates the instantaneous positions of near objects such as other ships, icebergs, buoys, or land, but in general does not display the course or paths of these external objects with respect to the radar ship except when the navigator manually plots successive instantaneous positions of the objects.

The present invention photographically plots successive positions of a nearby object giving an integrated course of such an object as related to the radar ship, so that the navigator may observe not only the position of the object but its path as related to the radar ship and its relative speed. Such information is an aid to navigation and especially helpful in avoiding collision at sea.

A further purpose of the invention is to provide a permanent record of the course of such objects.

Briefly described, the invention provides means for photographing the screen of the radar indicator tube by exposing the film for one complete cycle of motion of the radar antenna once each N cycles. Each frame of the photographic film records M of these exposures. More specifically, if the radar system is a plan-position-indicator (PPI) type in which the antenna rotates ten times a minute, the cycle of rotation of the antenna is 6 seconds which is the duration of each exposure. If N be assumed to be 10, then an exposure is made during one revolution in every 10 revolutions, or once each minute. Assuming M is 5, each frame of the film is exposed five times recording five positions of a nearby ship separated by one minute intervals. Each frame is, therefore, held in the taking position for 5 minutes.

When the exposure of one frame is completed the film is automatically advanced two frames and a new series of five successive positions are recorded on the second exposed frame. The first frame has advanced into a position where automatic processing takes place in, say, one-half minute. As soon as the processing is completed, the processing equipment is caused to slide out of the processing position permitting optical projection of the frame onto a screen located beside the radar indicating-tube screen. Thus there is displayed the course of a nearby ship for five minutes of time, a half minute after the end of the five minute period.

Means are provided for identifying the various records by photographing on each frame the time of day, the day, and the month. The direction of north as related to the direction of the axis of the ship is also recorded each minute on the record.

Means are also provided whereby any frame or series of frames may be selected for examination by projection of the frame on a screen.

The invention also consists in certain new and original features of construction and combinations of parts hereinafter set forth and claimed.

The nature of the invention, as to its objects and advantages, the mode of its operation and the manner of its organization, may be better understood by referring to the following description, taken in connection with the accompanying drawings forming a part thereof, in which Fig. 1 is a schematic diagram showing the units of the invention and their interconnections.

Figure 2:
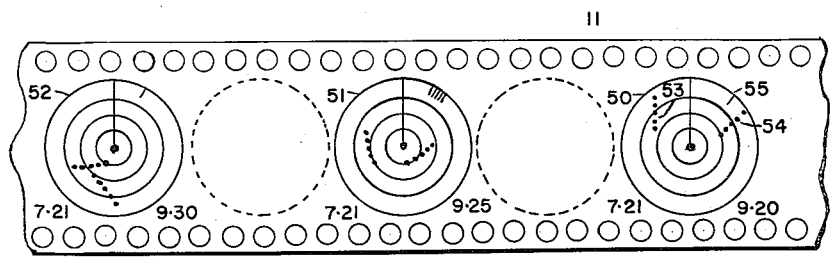

Fig. 2 represents a portion of the film record as it would appear after exposure and processing.

Like reference characters denote like parts in the several figures of the drawing.

In the following description parts will be identified by specific names for convenience, but they are intended to be generic in their application to similar parts.

Referring to Fig. 1, the transmitter and receiver of a plan-position-indicating radar is represented by block 2. The transmitter supplies microwave pulses through wave guide 3 and through block 4, containing the antenna rotating mechanism, to antenna 5.

The plan-position-indicating (PPI) tube is shown as tube 6. The deflection yoke for providing the radial scans in tube 6 is represented at 7, and is rotated in synchronism with the antenna 5 by motor 8, fed from a suitable alternating current power source 9. The echo pulses received by antenna 5 and receiver in block 2 pass to the modulating grid 10 of tube 6. The description up to this point applies to a conventional PPI radar system, but it is understood that any other type of radar system may be used.

The screen of indicator tube 6 is photographed on film 11, by a camera, contained in box 12, comprising lens 13, shutter 14, film support 15, and a film reel 16. The film, after exposure, is advanced by sprocket wheels 17 and 18 from the taking station at 15 to the processing station at 19'. The two halves 19 and 20 of the rapid-processing unit are automatically transferred from the position 19 and 20 to the dotted positions 19' and 20' where processing takes place. At the completion of the processing, which may take one-half minute or less, the processing unit is returned to the inactive positions 19 and 20 and the film is in position for projection by the projector comprising light 21, condensing lenses 22, and projecting lens 23. The light from projecting lens 23 is reflected by the two mirrors 24 and 25 so as to fall on screen 26 placed for convenience adjacent to the screen of tube 6.

The timing of the shutter, the advance of the film, and the shifting of the processing unit may be accomplished by any suitable means as, for example, by a commutator 27 mounted on gear wheel 28, which is driven by worm gear 29 mounted on the shaft of antenna 5. Gear 28 rotates once every N rotations of shaft 5. Brushes 30 and 31, bearing on the conducting segment 27, may be spaced so as to complete the circuit and open the shutter for one complete revolution of antenna 5. Similar contacts may actuate the film-advance mechanism and the shift of the processing unit in a manner familiar to any one skilled in the art. Since the yoke 7 rotates in synchronism with antenna 5, the timing mechanism just described may be operated by motor 8 instead of by the motor in block 4 which turns the antenna.

The timing mechanism for controlling the shutter also illuminates clock 32 which records on the film the time at which the first exposure of the frame occurs.

After passing out of box 12 the film passes into two storage stations 33 and 34, between which is located a second projector comprising lamp 35, condensing lenses 36, and projecting lens 37. The image is cast upon screen 38. The exposed film is then stored on reel 39.

Referring to Fig. 2, 50, 51, and 52 represent three successive frames with blank unexposed frames between. The range circles, for example for 1, 2, 3, and 4 miles, appear on the records. The relative courses 53 and 54 of two objects are indicated for illustration. Course 53 is that of a buoy to the right of which the radar ship is passing. Course 54 is that of a ship proceeding at first in a southerly direction. The dots on these courses represent the relative positions of these objects at one minute intervals.

The margin dot 55, produced by signals from the ships compass, represents the true north direction as related to the axis of the ship indicated by the radial line. In frame 51 the course of the radar ship is shown changing from a northwest direction to a north-north west direction. As a consequence of this alteration in direction of the ship the relative course of the buoy changes as shown in frames 51 and 52 for the second and third five minute records.

Although only a few of the various forms in which this invention may be embodied have been shown herein, it is to be understood that the invention is not limited to any specific construction but may be embodied in various forms without departing from the spirit of the invention.

What is claimed is:

1. A navigation course indicator system comprising a radar radiator having a cyclic sweep and a receiver including a cathode-ray tube having a screen and having means responsive to echo pulses to produce electronically spots on said screen which represent the bearing and range of an object at successive sweeps of said radiator, a camera disposed to photograph said screen on a frame of a photographic film, means synchronized with the sweep of said radiator to actuate said camera at intervals spaced by a predetermined number of radiator sweeps to record on a single frame of said film a selected series of screen images representing successive positions of said object, means advancing said film after a predetermined series of camera actuations, means processing the exposed frame, and means projecting an image of said processed frame for observation.

2. In a system as set forth in claim 1 means superimposing on said film an image representing a known direction.

References Cited in the file of this patent
UNITED STATES PATENTS
2,586,772 Ashby ---------------- Feb. 26, 1952